(12) United States Patent
Somei et al.

(10) Patent No.: US 11,107,638 B2
(45) Date of Patent: Aug. 31, 2021

(54) DYE-SENSITIZED SOLAR CELL AND METHOD OF MANUFACTURING THE SAME

(71) Applicant: TAIYO YUDEN CO., LTD., Tokyo (JP)

(72) Inventors: Hidenori Somei, Takasaki (JP); Takeyuki Fukushima, Takasaki (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 0 days.

(21) Appl. No.: 16/365,413

(22) Filed: Mar. 26, 2019

(65) Prior Publication Data

US 2019/0304706 A1   Oct. 3, 2019

(30) Foreign Application Priority Data

Mar. 30, 2018   (JP) .............................. JP2018-069951

(51) Int. Cl.
*H01G 9/20* (2006.01)
*H01G 9/00* (2006.01)

(52) U.S. Cl.
CPC ......... *H01G 9/2022* (2013.01); *H01G 9/0036* (2013.01); *H01G 9/2009* (2013.01)

(58) Field of Classification Search
None
See application file for complete search history.

(56) References Cited

U.S. PATENT DOCUMENTS

| 6,664,623 | B1 * | 12/2003 | Phani | H01G 9/2081 257/698 |
| 2010/0132785 | A1 * | 6/2010 | Morooka | H01M 14/005 136/256 |
| 2011/0139248 | A1 * | 6/2011 | Liu | H01G 9/2095 136/260 |

(Continued)

FOREIGN PATENT DOCUMENTS

| JP | 2006236788 A | 9/2006 |
| JP | 2007073401 A | 3/2007 |
| JP | 2012113946 A | 6/2012 |

OTHER PUBLICATIONS

Kolemen et al., Org. Lettr., 2010, vol. 12, No. 17, pp. 3812-3815. (Year: 2010).*

(Continued)

*Primary Examiner* — Eli S Mekhlin
(74) *Attorney, Agent, or Firm* — Law Office of Katsuhiro Arai

(57) ABSTRACT

A dye-sensitized solar cell includes: a transparent electrode; a power generation layer on the first main surface of the transparent electrode, including a semiconductor layer, a photosensitizing dye and an electrolyte layer; a counter electrode on the main surface of the power generation layer, having an electrode extraction region, wherein at least a part of the side surfaces of the counter electrode and at least a part of the side surfaces of the power generation layer are positioned coplanar, the electrode extraction region of the counter electrode overlaps with at least a part of the main (Continued)

surface of the power generation layer in a top view, and the side surfaces of the power generation layer are covered with a sealing layer formed extending from one of the transparent electrode and the counter electrode to the other.

13 Claims, 4 Drawing Sheets

(56) References Cited

U.S. PATENT DOCUMENTS

| | | | | |
|---|---|---|---|---|
| 2011/0240116 A1* | 10/2011 | Morooka | ............. | H01G 9/2068 136/256 |
| 2012/0009715 A1* | 1/2012 | Sim | ...................... | H01G 9/2009 438/61 |
| 2017/0084400 A1* | 3/2017 | Cheng | ..................... | C30B 29/12 |

OTHER PUBLICATIONS

A First Office Action issued by the State Intellectual Property Office of China dated Jan. 6, 2021for Chinese counterpart application No. 201910252676.2 (9 pages).

* cited by examiner

[FIG. 1A]
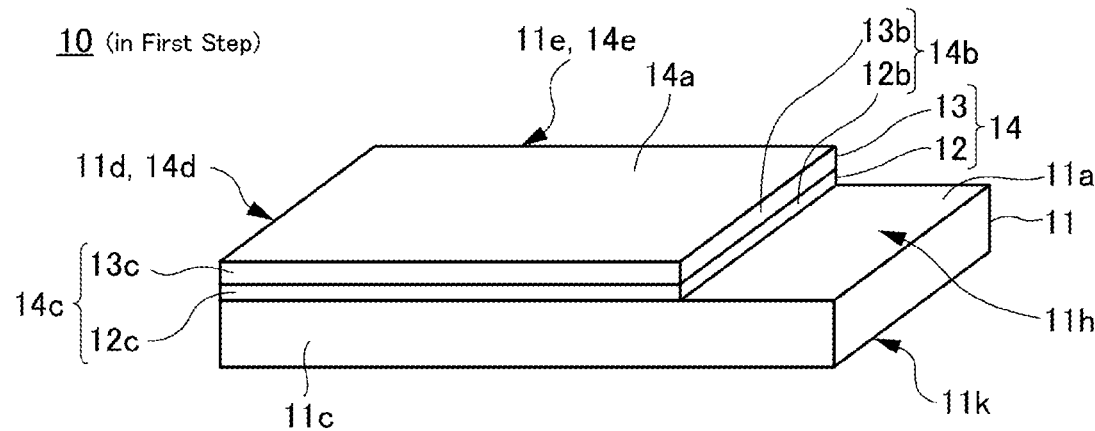
[FIG. 1B]
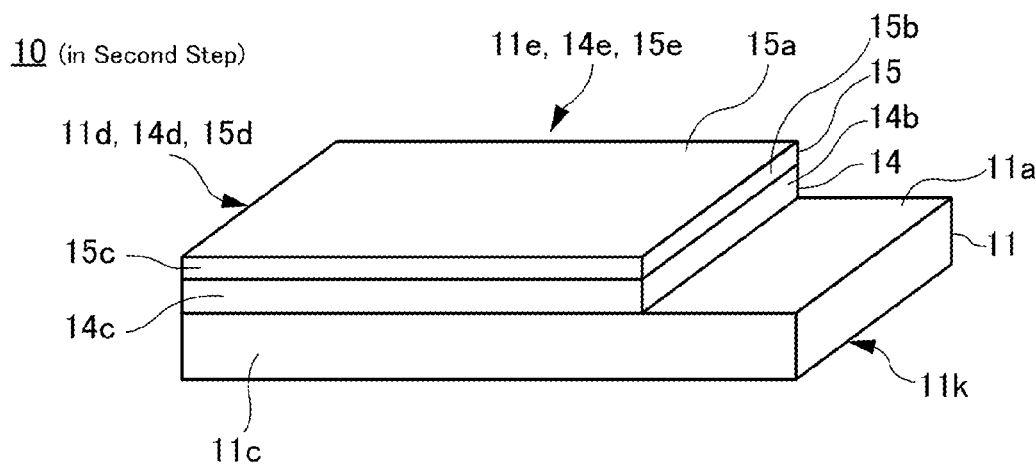
[FIG. 1C]
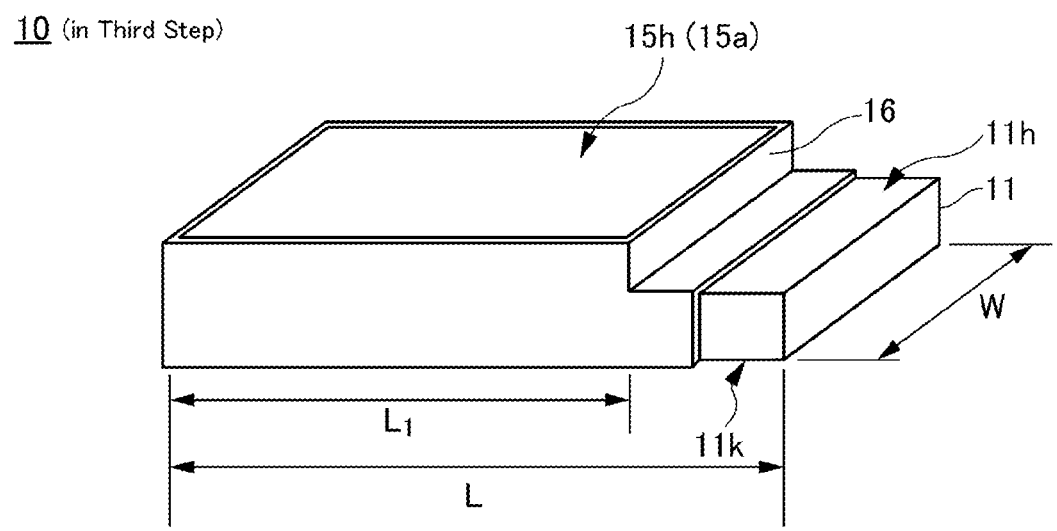

[FIG. 2]
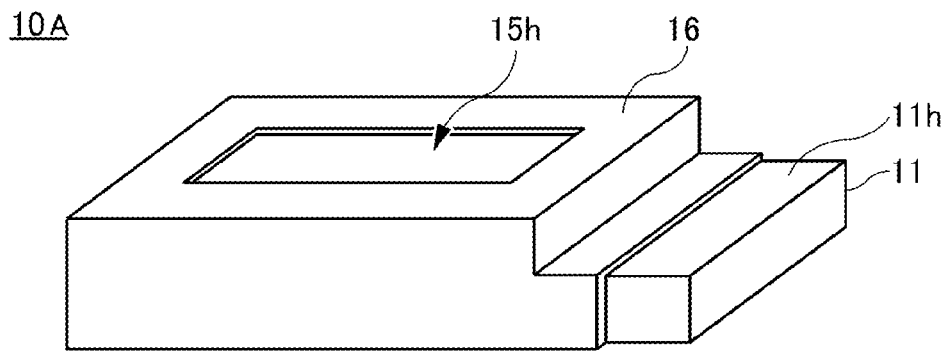
[FIG. 3A]
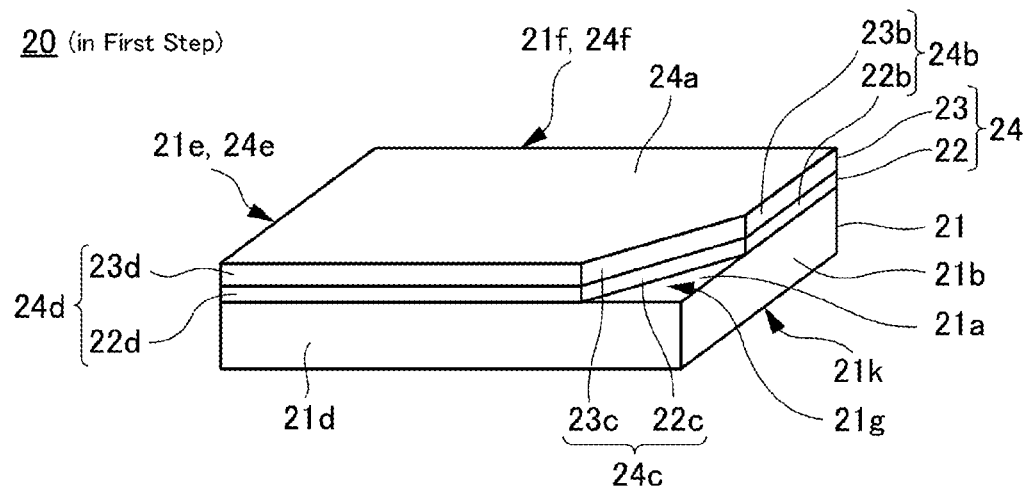
[FIG. 3B]
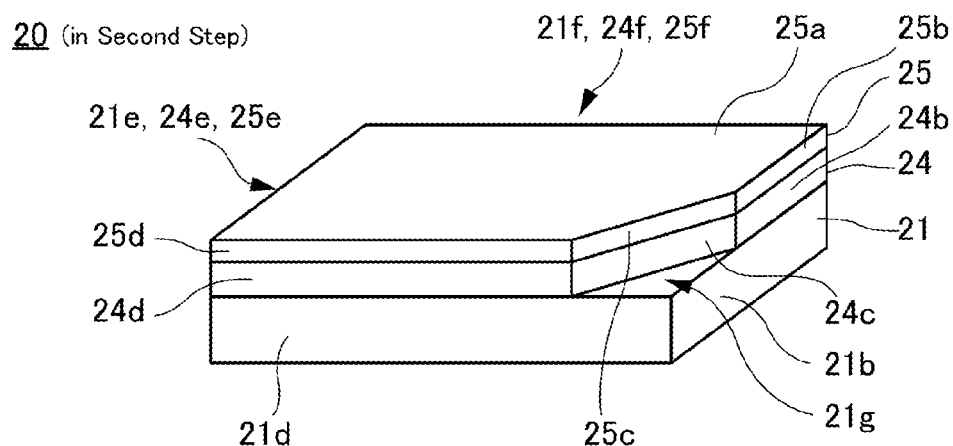

[FIG. 3C]
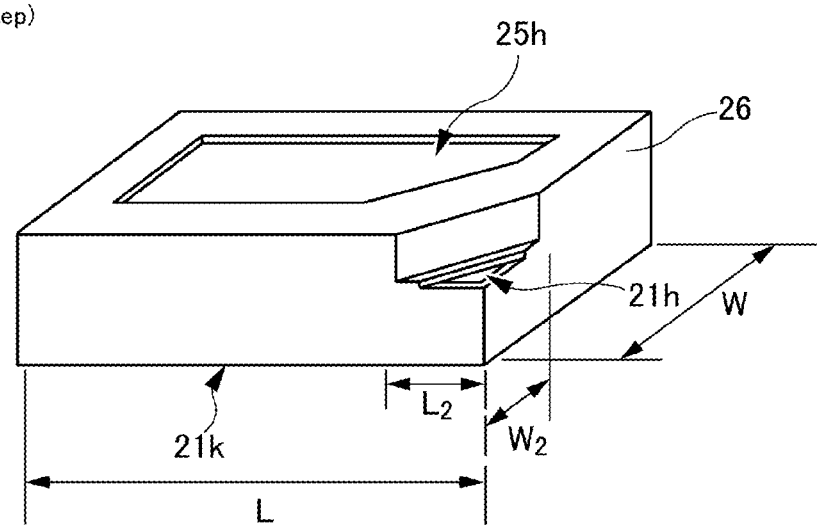
[FIG. 4]
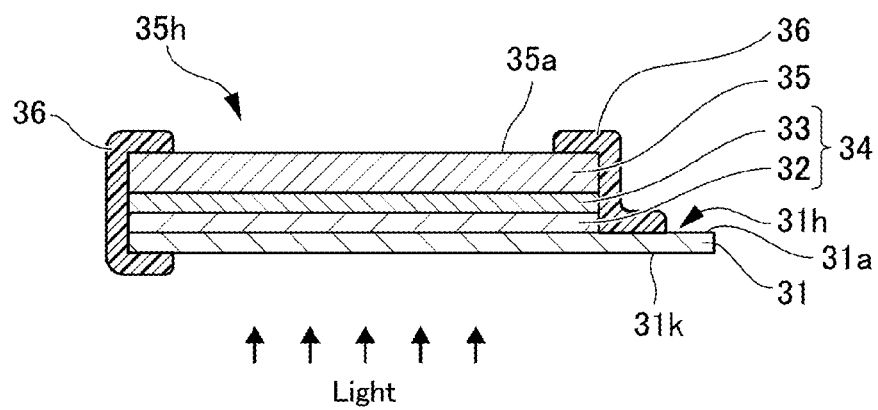

[FIG. 5]
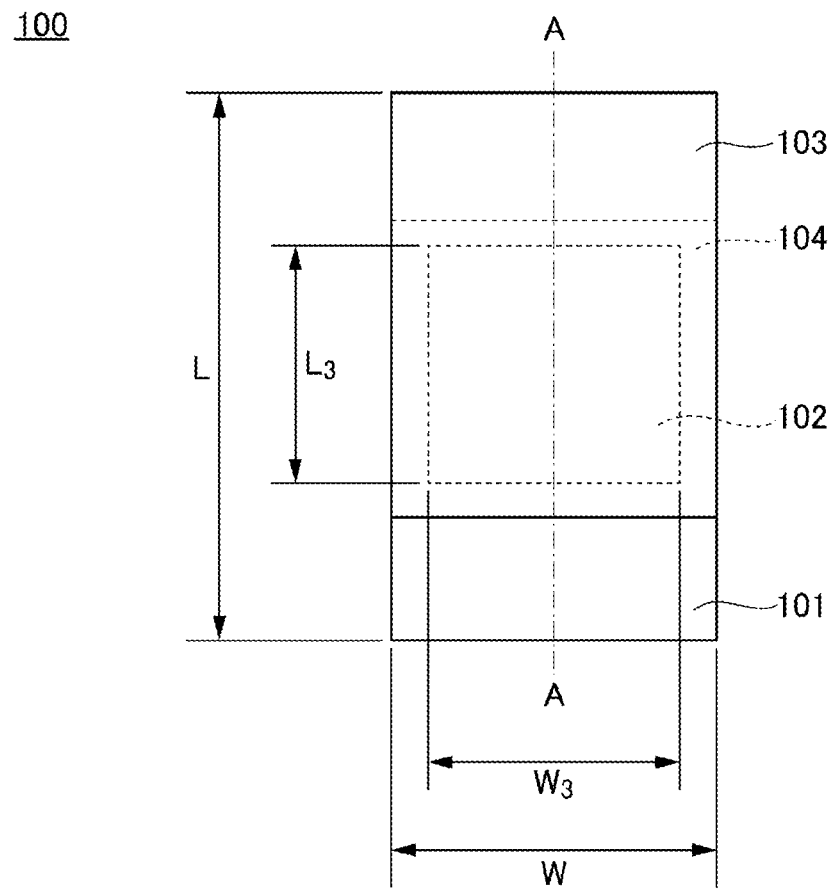
[FIG. 6]
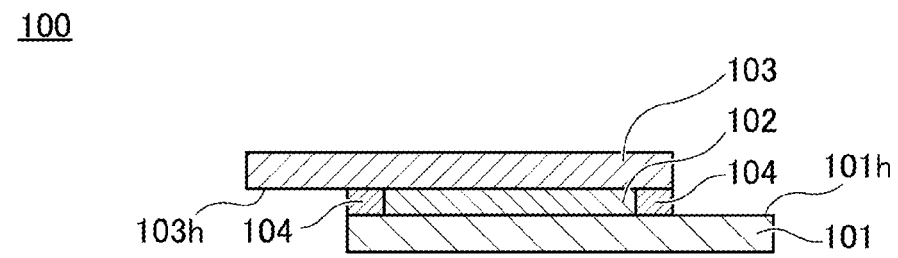

DYE-SENSITIZED SOLAR CELL AND METHOD OF MANUFACTURING THE SAME

TECHNICAL FIELD

The present invention relates to a dye-sensitized solar cell and a method of manufacturing the same.

BACKGROUND ART

Generally, a dye-sensitized solar cell includes a transparent electrode, a power generation layer and a counter electrode formed in this order. The power generation layer is composed of an oxide semiconductor layer with a photosensitizing dye adsorbed therein and an electrolyte layer, and by receiving light from a side of the transparent electrode, an electromotive force is generated by the photoelectric conversion effect of the oxide semiconductor layer. The power generation layer has a sealed structure by being vertically sandwiched between the transparent electrode and the counter electrode and being sealed around side surfaces thereof with a sealing layer. However, since the sealing layer exists in a region overlapping the transparent electrode and the counter electrode in a top view, an area contributing to the photoelectric conversion effect decreases by an area of the sealing layer to be limited to an area of a main surface of the power generation layer.

Patent Literature 1 discloses a photoelectric conversion device in which a coating material made of a metal or a metal oxide is adhered to a surface other than a light receiving surface. According to this photoelectric conversion device, by covering the surface other than the light receiving surface with the coating material made of a metal or a metal oxide, it is possible to secure largely an area contributing to the photoelectric conversion effect without decreasing an amount of received light.

However, the photoelectric conversion device described in Patent Literature 1 has still room for improvement in terms of increasing an area contributing to the photoelectric conversion effect per light receiving area (hereinafter, an area ratio thereof is referred to as "power generation area efficiency").

PRIOR ART DOCUMENTS

Patent Documents

[Patent Document 1] Japanese Unexamined Patent Application Publication No. 2006-236788

SUMMARY OF THE INVENTION

The present invention has been made in view of the above circumstances, and an object thereof is to provide a dye-sensitized solar cell with larger power generation area efficiency and a method of manufacturing the same.

In accordance with a first aspect of the present invention, a dye-sensitized solar cell includes: a transparent electrode having a first main surface and a second main surface; a power generation layer formed on the first main surface of the transparent electrode, including a semiconductor layer, a photosensitizing dye and an electrolyte layer and having a main surface and side surfaces; and a counter electrode formed on the main surface of the power generation layer, having a main surface, side surfaces and an electrode extraction region, wherein at least a part of the side surfaces of the counter electrode and at least a part of the side surfaces of the power generation layer are positioned coplanar, wherein the electrode extraction region of the counter electrode overlaps with at least a part of the main surface of the power generation layer in a top view, and wherein the side surfaces of the power generation layer are covered with a sealing layer formed extending from one of the transparent electrode and the counter electrode to the other.

The electrolyte layer may be in a gel-like state or in a solid-like state.

The electrolyte layer may contain a matrix.

The sealing layer may contain an ultraviolet curable resin or a thermosetting resin.

The sealing layer may include a reflective member.

The sealing layer may be formed onto at least a part of the main surface of the counter electrode, and the electrode extraction region of the counter electrode may be arranged in a region not having the sealing layer on the main surface of the counter electrode.

The counter electrode may be formed in a conductive thin film.

The sealing layer may be transparent and may be formed extending from the counter electrode to a side surface and at least a part of the second main surface of the transparent electrode.

The transparent electrode may be formed in a conductive thin film.

In accordance with a second aspect of the present invention, a method of manufacturing a dye-sensitized solar cell includes: a first step of obtaining a power generation layer by forming a semiconductor layer on a first main surface of a transparent electrode, allowing a photosensitizing dye to be absorbed onto the semiconductor layer, and forming an electrolyte layer in a gel-like state or in a solid-like state on the semiconductor layer with the photosensitizing dye absorbed; a second step of forming a counter electrode on the power generation layer in such a manner that at least a part of side surfaces of the counter electrode and at least a part of side surfaces of the power generation layer are positioned coplanar and an electrode extraction region overlaps with at least a part of a main surface of the power generation layer in a top view; and a third step of forming a sealing layer extending from one of the transparent electrode and the counter electrode to the other so as to cover side surfaces of the power generation layer.

In accordance with a third aspect of the present invention, a method of manufacturing a dye-sensitized solar cell includes: a first step of obtaining a power generation layer by forming a semiconductor layer on a first main surface of a transparent electrode, allowing a photosensitizing dye to be absorbed onto the semiconductor layer, and forming an electrolyte layer on the semiconductor layer with the photosensitizing dye absorbed; a second step of forming a counter electrode on the power generation layer in such a manner that at least a part of side surfaces of the counter electrode and at least a part of side surfaces of the power generation layer are positioned coplanar and an electrode extraction region overlaps with at least a part of a main surface of the power generation layer in a top view; and a third step of forming a sealing layer extending from one of the transparent electrode and the counter electrode to the other so as to cover side surfaces of the power generation layer, wherein the electrolyte layer is in a gel-like state or in a solid-like state at least until termination of the third step from start of forming the electrolyte layer.

According to the present invention, it is possible to provide a dye-sensitized solar cell with larger power generation area efficiency and a method of manufacturing the same.

BRIEF DESCRIPTION OF DRAWINGS

FIG. 1A is a perspective view showing a dye-sensitized solar cell according to a first embodiment of the present invention in a first step of a first method of manufacturing the same;

FIG. 1B is a perspective view showing a dye-sensitized solar cell according to the first embodiment of the present invention in a second step of the first method of manufacturing the same;

FIG. 1C is a perspective view showing a dye-sensitized solar cell according to the first embodiment of the present invention in a third step of the first method of manufacturing the same;

FIG. 2 is a perspective view showing a modification of the first embodiment;

FIG. 3A is a perspective view showing a dye-sensitized solar cell according to a second embodiment of the present invention in a first step of a second method of manufacturing the same;

FIG. 3B is a perspective view showing a dye-sensitized solar cell according to the second embodiment of the present invention in a second step of the second method of manufacturing the same;

FIG. 3C is a perspective view showing a dye-sensitized solar cell according to the second embodiment of the present invention in a third step of the second method of manufacturing the same;

FIG. 4 is a schematic cross-sectional view showing a dye-sensitized solar cell according to a third embodiment of the present invention;

FIG. 5 is a schematic top view showing a conventional dye-sensitized solar cell; and FIG. 6 is a schematic cross-sectional view showing the conventional dye-sensitized solar cell.

DESCRIPTION OF EMBODIMENTS

First Embodiment

Hereinafter, a dye-sensitized solar cell according to a first embodiment of the present invention is described together with a first method of manufacturing the same. FIGS. 1A to 1C show the dye-sensitized solar cell 10 according to the first embodiment in a first step, a second step and a third step of the first method of manufacturing the same, respectively.
<First Step>

As shown in FIG. 1A, a transparent electrode 11 in a rectangular shape is prepared. The transparent electrode 11 has a first main surface 11a, a second main surface 11k, a side surface 11c, a side surface 11d and a side surface 11e. A power generation layer 14 is obtained by forming a semiconductor layer 12 on the first main surface 11a of the transparent electrode 11, allowing a photosensitizing dye (not shown) to be absorbed onto the semiconductor layer 12, and forming an electrolyte layer 13 on the semiconductor layer 12 with the photosensitizing dye absorbed.
(Transparent Electrode)

The transparent electrode 11 functions as a negative electrode of the dye-sensitized solar cell 10. The second main surface 11k of the transparent electrode 11 is a light incident surface. The transparent electrode 11 may be obtained by disposing a transparent conductive film on a glass substrate or a plastic substrate. With respect to materials for the transparent conductive film, any material for negative electrodes of known dye-sensitized solar cells may be referred. For example, from the viewpoint of emphasis on high conductivity and translucency, examples thereof may include zinc oxide, indium-tin complex oxide, a laminate including an indium-tin complex oxide layer and a silver layer, antimony-doped tin oxide, fluorine-doped tin oxide (FTO) or the like. Among others, FTO is preferable for reason of particularly high conductivity and translucency.

A thickness of the transparent electrode 11 may be optionally determined. For example, a thickness of the glass substrate is preferably more than or equal to 100 μm and less than or equal to 3 mm, a thickness of the plastic substrate is preferably more than or equal to 10 μm and less than or equal to 300 μm, and a thickness of the transparent conductive film is preferably more than or equal to 0.01 μm and less than or equal to 0.3 μm. The transparent electrode 11 may also be a conductive thin film. For example, the transparent conductive film having a thickness of more than or equal to 0.01 μm and less than or equal to 0.3 μm may be disposed on the plastic substrate having a thickness of more than or equal to 10 μm and less than or equal to 300 μm.

A surface resistance of the transparent electrode 11 is preferably about less than or equal to 200 Ω/sq., for example. In a dye-sensitized solar cell to be used under sunlight, the surface resistance of the transparent electrode 11 is mostly about 10 Ω/sq. However, a dye-sensitized solar cell for indoor use is expected to be used under a fluorescent lamp or the like having lower illuminance than sunlight, and it is less affected by a resistance component contained therein because of a small photoelectron quantity (photocurrent value). So, the surface resistance of the transparent electrode 11 may be, for example, more than or equal to 20 Ω/sq. and less than or equal to 200 Ω/sq. rather than an extremely low resistance.
(Power Generation Layer)

The power generation layer 14 is described hereinafter. The power generation layer 14 includes the semiconductor layer 12, the photosensitizing dye (not shown) and the electrolyte layer 13. A side surface 14b of the power generation layer 14 is constituted by a side surface 12b of the semiconductor layer 12 and a side surface 13b of the electrolyte layer 13, and a side surface 14c of the power generation layer 14 is constituted by a side surface 12c of the semiconductor layer 12 and a side surface 13c of the electrolyte layer 13. A reference sign 14d is assigned to a side surface opposite to the side surface 14b of the power generation layer 14, and a reference sign 14e is assigned to a side surface opposite to the side surface 14c of the power generation layer 14. The side surface 14d and the side surface 14e are also constituted by side surfaces of the semiconductor layer 12 and the electrolyte layer 13, respectively, like as the side surface 14b and the side surface 14c.
—Semiconductor Layer—

The semiconductor layer 12 may be formed by applying a slurry with oxide semiconductor particles dispersed on the first main surface 11a of the transparent electrode 11 and followed by firing it. The slurry may be applied by an applying method using a doctor blade or a bar coater, a spray method, a dip coating method, a screen printing method, a gravure printing method, a spin coating method or the like. Examples of the oxide semiconductor particles included in the semiconductor layer 12 may include an oxide of metal such as Cd, Zn, In, Pb, Mo, W, Sb, Bi, Cu, Hg, Ti, Ag, Mn, Fe, V, Sn, Zr, Sr, Ga, Si, Cr or Nb, and perovskite oxide such as $SrTiO_3$ or $CaTiO_3$. One of these oxides may be employed, or a complex containing two or more of these oxides may be employed. Among others, $TiO_2$ may be preferable, because it is chemically stable and has excellent photoelectric conversion property.

The oxide semiconductor particles play a role of transferring electrons to the transparent electrode 11 from the photosensitizing dye having absorbed light in a state supported on a surface of the particles. And also, the oxide semiconductor particles have the effect of holding the electrolyte in minute voids formed by the oxide semiconductor particles.

A thickness of the semiconductor layer 15 may be preferably more than or equal to 100 nm and less than or equal to 40 μm. By setting up the thickness as more than or equal to 100 nm, it is possible to well suppress contacts of $I_3^-$ with the transparent electrode 11. And, by setting up the thickness as less than or equal to 40 μm, it is possible to well transfer electrons to the transparent electrode 11. The semiconductor layer 15 may be manufactured by, for example, a method of applying a paste containing the oxide semiconductor particles and followed by drying and heating it.

—Photosensitizing Dye—

The photosensitizing dye is supported on the semiconductor layer 12, and the oxide semiconductor particles in the semiconductor layer 12 are sensitized by the photosensitizing dye. As materials for the photosensitizing dye, for example, various dyes such as a metal complex dye and an organic dye may be employed. Examples of the metal complex dye may include a transition metal complex such as a ruthenium-cis-diaqua-bipyridyl complex, a ruthenium-tris complex, a ruthenium-bis complex, an osmium-tris complex or an osmium-bis complex; zinc-tetra(4-carboxyphenyl) porphyrin; an iron-hexacyanide complex; and phthalocyanine. Examples of the organic dye may include a 9-phenylxanthene dye, a coumarin dye, an acridine dye, a triphenylmethane dye, a tetraphenylmethane dye, a quinone dye, an azo dye, an indigo dye, a cyanine dye, a merocyanine dye, a xanthene dye and a carbazole compound dye.

A method of applying the photosensitizing dye is not particularly limited. For example, it is acceptable to employ a method in which a solution containing the photosensitizing dye is applied on the semiconductor layer 12 and then dried. Alternatively, it is also acceptable to employ a method in which the transparent electrode 11 provided with the semiconductor layer 12 is immersed in a solution containing the photosensitizing dye and then dried. Examples of a solvent of the solution containing the photosensitizing dye include water, alcohol, acetonitrile, toluene and dimethylformamide. A size of individual particle of the oxide semiconductor particles included in the semiconductor layer 12 may be preferably about more than or equal to 5 nm and less than or equal to 1 μm in diameter.

—Electrolyte Layer—

The electrolyte layer 13 may be composed of a liquid electrolyte, a gel-like electrolyte or a solid electrolyte. Among these, from the viewpoints of improving manufacturing easiness and increasing voltage to be generated, the gel-like electrolyte or the solid electrolyte is more preferable, and the gel-like electrolyte or the solid electrolyte containing a redox pair is furthermore preferable. Hereinafter, the electrolyte layer 13 containing a redox pair is sometimes described as an example, but the electrolyte layer 13 is not limited thereto. The electrolyte layer containing a redox agent may have a single layer structure composed of a single material or a laminate structure composed of a plurality of compounds.

As the liquid electrolyte, for example, an electrolytic solution in which a redox pair is dissolved in an organic solvent may be mentioned. As a redox pair, known one in use for a dye-sensitized solar cell as usual may be employed. Examples of the redox pair may include $I^-/I_3^-$ series, $Br^-/Br_3^-$ series, $Fe^{2+}/Fe^{3+}$ series, quinone/hydroquinone series and the like. Among these, the $I^-/I_3^-$ series is particularly preferable. $I^-/I_3^-$ series may be formed of tetraalkylammonium iodide such as tetrapropylammonium iodide; asymmetric alkylammonium iodide such as methyltripropylammonium iodide or diethyldibutylammonium iodide; or quaternary ammonium iodide compound such as pyridinium iodide in combination with iodine. Quaternary ammonium iodide compound is ionized in the polymer compound to generate ammonium ions with an alkyl group. When the electrolyte layer 13 contains ammonium ions with an alkyl group, it is possible to achieve a relatively high voltage value even under low illuminance.

Further, it is preferable that at least one of atoms included in the alkyl group is substituted with a nitrogen atom, an oxygen atom, a halogen atom or the like. When an ammonium ion contains a plurality of alkyl groups, it is preferable that a part of the plurality of alkyl groups is substituted with an aralkyl group, an alkenyl group or an alkynyl group.

Here, a concentration of $I^-$ contained in the electrolyte is preferably more than or equal to 1 mol/L and less than or equal to 10 mol/L. This concentration is significantly higher than a concentration of $I^-$ in an electrolyte of a dye-sensitized solar cell as known. In addition, the concentration of $I^-$ in the electrolyte is more than or equal to 2 million times and less than or equal to 200 million times with respect to a concentration of $I_3^-$. This concentration ratio is significantly higher than a concentration ratio in a dye-sensitized solar cell as known. The concentrations of $I_3^-$ and $I^-$ are determined by an abundance ratio of iodine $I_2$ and the above-mentioned iodine compound which generates iodide ions $I^-$.

By setting up the concentration of $I^-$ in the electrolyte as more than or equal to 1 mol/L and less than or equal to 10 mol/L, it is expected to achieve the effect of accelerating electron transfer from $I^-$ to the photosensitizing dye. By setting up the concentration of $I^-$ in the electrolyte as more than or equal to 2 million and less than or equal to 200 million times with respect to $I_3^-$, it is expected to achieve the effect of suppressing electron transfer from the transparent electrode 11, the oxide semiconductor particles and the photosensitizing dye to $I_3^-$. As a result of these effects, it is expected that a power generation amount and a current value are increased, particularly, under a low illuminance environment. In addition, since the concentration of $I^-$ in the electrolyte layer 13 is high, a contact probability of $I_3^-$ to the transparent electrode 11, the oxide semiconductor particles and the photosensitizing dye is decreased, and then it is expected that the power generation amount further is increased.

Examples of the organic solvent in use for the liquid electrolyte may include acetonitrile, methoxy acetonitrile, methoxypropionitrile, propionitrile, ethylene carbonate, propylene carbonate, diethyl carbonate, γ-butyrolactone, valeronitrile, pivalonitrile and the like.

As the gel-like electrolyte, a gel electrolyte obtained by impregnating a matrix with a liquid dissolving a redox pair in an organic solvent, or a quasi-solid electrolyte obtained by impregnating a matrix with a liquid dissolving a redox pair in an organic solvent and followed by removing the organic solvent may be mentioned. Examples of the matrix may include polymers, clays and the like. Since the gel-like electrolyte contains the matrix, adhesiveness with a sealing layer 16 described later is improved, and then the gel-like electrolyte can be sealed more firmly to enhance reliability over time.

The gel-like electrolyte may be obtained by preparing a solution from polymerized polymers, an electrolyte and a solvent, forming a sol-like electrolyte layer on the semiconductor layer supporting the photosensitizing dye and followed by removing the organic solvent in excess. The sol-like electrolyte layer may be formed by a method such as a casting method, a coating method, a dipping method or an impregnation method. In addition, the gel-like electrolyte may also be obtained by preparing a solution from polyfunctional monomers, a polymerization initiator, an electrolyte and a solvent, forming a sol-like electrolyte layer on the semiconductor layer supporting the photosensitizing dye and followed by performing radical polymerization. The sol-like electrolyte layer may be formed in the same manner.

The polymer in use for the gel-like electrolyte is not particularly limited as long as it is a polymer capable of forming a gel together with an electrolytic solution. Examples of the polymer may include polyethylene glycol, polyethylene oxide, polyvinyl pyrrolidone, polyvinyl alcohol, polyester, poly amide, polycarbonate, polyimide, polyurethane, polyurea, polymethyl methacrylate, polyvinyl acetate, polyvinyl chloride, polyvinylidene fluoride, ethyl cellulose and the like. Preferred polymers may include polyethylene glycol, polyethylene oxide, polyvinyl pyrrolidone, polyvinyl alcohol, polyacrylonitrile, polyvinylidene fluoride. Examples of a clay in use may include particles of silicon dioxide, particles of zirconium oxide, particles of titanium oxide, particles of montmorillonite mineral and the like.

A content of the polymer in the gel-like electrolyte is more than or equal to 1 wt. % and less than or equal to 50 wt. %. By setting up the content as more than or equal to 1 wt. %, it is possible to hold satisfactorily the electrolytic solution and prevent liquid leakage. By setting up the content as less than or equal to 50 wt. %, it is possible to keep satisfactorily ionic conductivity. A weight-average molecular weight of the polymer is preferably more than or equal to 2,000 and less than or equal to 10 million. By being more than or equal to 2,000, it is possible to form easily a sealing layer as described later since the electrolyte is gelled to be not in a liquid state. By being less than or equal to 10 million, it is possible to keep ionic conductivity satisfactorily.

As the solid electrolyte, an organic semiconductor material such as a molten salt containing a redox pair, an oxadiazole compound or a pyrazoline compound, and a metal halide material such as copper iodide or copper bromide may be mentioned. The solid electrolyte is formed by applying a solid electrolyte precursor (coating composition) containing a solvent and followed by removing a solvent. As the solvent, those as described above may be employed in the same manner.

As the electrolyte, an ionic liquid may also be employed. Examples of the ionic liquid may include a known iodine salt such as a pyridinium salt, an imidazolium salt or a triazolium salt, which is an ambient temperature molten salt in a molten state at around room temperature. Examples of the ambient temperature molten salt may include a quaternary ammonium iodide salt compounds and the like such as 1-methyl-3-propylimidazolium iodide, 1-butyl-3-methyl-imidazolium iodide (BMII), 1-ethyl-pyridinium iodide.

The electrolyte layer 13 may contain an additive. Examples of the additive may include lithium iodide, sodium iodide, pyridine, pyridine derivatives, imidazole, imidazole derivatives, and borate tri-o-cresyl ester (($CH_3C_6H_4O)_3B$), benzoic acid, dimethylaminobenzonic acid. A content of the additive is preferably more than or equal 0.1 wt. % and less than 20 wt. % in the electrolyte layer 13. More preferably, it is more than or equal to 1 wt. % and less than 10 wt. %.

Since the power generation layer 14 is positioned coplanar with the side surface of the counter electrode 15, it is preferable that the power generation layer 14 is in a gel-like state or in a solid-like state at least until termination of a third step described later from start of forming the electrolyte layer 13, and it is preferable to form the power generation layer 14 by an ink jet, a dispenser or a screen printing. When the electrolyte layer 13 is composed of a liquid electrolyte having a solvent, a gel-like electrolyte layer may be obtained by applying it with an ink jet or a dispenser and followed by instantly volatilizing the solvent. Besides, the electrolyte layer 13 may be formed by solidifying a substrate immediately after an applying process with liquid nitrogen or the like at or below a melting point of a liquid electrolyte. When solidifying the electrolyte layer 13 immediately after an applying process below a melting point of a liquid electrolyte, the sealing layer 16 described later may be formed while keeping a low temperature.

<Second Step>

Next, as shown in FIG. 1B, the counter electrode 15 is formed on a main surface 14a (see FIG. 1A) of the power generation layer 14. The counter electrode 15 is formed in such a manner that a side surface 15b, a side surface 15c, a side surface 15d opposite to the side surface 15b and a side surface 15e opposite to the side surface 15b thereof are positioned coplanar with the side surface 14b, the side surface 14c, the side surface 14d and the side surface 14e of the power generation layer 14, respectively, and an electrode extraction region 15h (see FIG. 1C) of the counter electrode 15 overlaps with the main surface 14a of the power generation layer 14 in a top view. Further, the side surface 14c, the side surface 14d and the side surface 14e of the power generation layer 14 are also positioned coplanar with the side surface 11c, the side surface 11d and the side surface 11e of the transparent electrode 11, respectively.

(Counter Electrode)

The counter electrode 15 functions as a positive electrode of the dye sensitized solar cell 10. Materials for the counter electrode 15 are not particularly limited, and materials as with the transparent electrode 11 may be employed. In addition, the counter electrode 15 may include a material performing catalysis to give electrons to electrolyte oxidant. Examples of the counter electrode 15 may include a metal such as platinum, gold, silver, copper, aluminum, rhodium or indium; graphite; carbon supporting platinum; and a metal oxide such as indium-tin complex oxide, antimony-doped tin oxide or fluorine-doped tin oxide. Further, an organic semiconductor such as poly(3,4-ethylenedioxythiophene) (PEDOT) or polythiophene may be also included in examples. Among others, platinum and graphite are particularly preferable.

<Third Step>

Finally, as shown in FIG. 1C, a sealing layer 16 is formed extending from the transparent electrode 11 to the counter electrode 15 so as to cover the side surface 14b, the side surface 14c, the side surface 14d and the side surface 14e of the power generation layer 14. Here, "extending from one of the transparent electrode 11 and the counter electrode 15 to the other" means that the sealing layer 16 covers the power generation layer 14 from at least a part of the side surface of the transparent electrode 11 to at least a part of the side surface of the counter electrode 15. It is not always necessary to cover entirely the side surfaces of the transparent electrode 11 and the counter electrode 15, but it is preferable to cover entirely the side surfaces of the transparent electrode 11, the power generation layer 14 and the counter electrode 15 from the viewpoints of gas barrier property, transparency, strength, weather resistance and the like. In the dye-sensitized solar cell 10 according to the first embodiment, the main surface 15*a* of the counter electrode 15 is the electrode extraction region 15*h* of the counter electrode 15, and a region not having the sealing layer 16 on the first main surface 11*a* of the transparent electrode 11 is the electrode extraction region 11*h* of the transparent electrode 11.

The sealing layer 16 preferably contains a resin curable by heat, light, electron beam or the like. From the viewpoints of gas barrier property, transparency, strength, weather resistance and the like, a thermosetting resin or an ultraviolet curable resin is particularly preferable. Examples of the thermosetting resin may include an epoxy resin. Examples of the ultraviolet curable resin may include an acrylic resin such as urethane acrylate, acrylic resin acrylate or epoxy acrylate. The sealing layer 16 may be formed by applying it from one of the transparent electrode 11 and the counter electrode 15 to the other so as to cover the side surface of the power generation layer 14 and followed by curing.

The sealing layer 16 may include a reflective member. For example, after forming the sealing layer 16, a reflective layer may be provided on the surface of the sealing layer 16. Examples of the reflecting layer may include a resin layer obtained by sputtering a thin film having high reflectivity such as titanium, silver, a silver alloy or the like. Reflective metal oxide particles may also be contained in the resin of the sealing layer. Examples of the reflective metal oxide particles may include titanium oxide, zinc oxide, aluminum oxide, zirconium oxide and the like.

As shown in FIGS. 1A to 1C, the dye-sensitized solar cell 10 manufactured as described above includes: the transparent electrode 11 having the first main surface 11*a* and the second main surface 11*k*; the power generation layer 14 formed on the surface 11*a* of the transparent electrode 11, including the semiconductor layer 12, the photosensitizing dye (not shown) and the electrolyte layer 13 and having the main surface 14*a* and the side surfaces 14*b*, 14*c*, 14*d*, 14*e*; the counter electrode 15 formed on the main surface 14*a* of the power generation layer 14, having the main surface 15*a*, the side surfaces 15*b*, 15*c*, 15*d*, 15*e* and the electrode extraction region 15*h*, wherein the side surfaces 15*b*, 15*c*, 15*d*, 15*e* of the counter electrode 15 and the side surfaces 14*b*, 14*c*, 14*d*, 14*e* of the power generation layer 14 are positioned coplanar and the electrode extraction region 15*h* of the counter electrode 15 overlaps with the main surface 14*a* of the power generation layer 14 in a top view; and the sealing layer 16 formed extending from the entire side surfaces of the transparent electrode to the entire side surfaces of the counter electrode so as to cover the side surfaces 14*b*, 14*c*, 14*d*, 14*e* of the power generation layer 14.

The dye-sensitized solar cell 10 having the main surfaces in a rectangular shape of the power generation layer 14 and the counter electrode 15 has been described in the first embodiment, but the main surfaces of the power generation layer 14 and the counter electrode 15 may have any shape such as a circle or polygon shape. In such a case of the dye-sensitized solar cell 10 having any shape of the main surfaces of the power generation layer 14 and counter electrode 15, it is also necessary to cover at least the side surface of the power generation layer 14 with the sealing layer 16, but it is enough to cover partially the side surfaces of other elements with the sealing layer 16. From the viewpoint of gas barrier property, transparency, strength, weather resistance and the like, it is preferable to cover entirely the side surfaces of the transparent electrode 11, the power generation layer 14 and the counter electrode 15.

<Power Generation Area Efficiency>

As shown in FIG. 1C, a cell light receiving area in the first embodiment is represented by L×W, a power generation area is represented by $L_1 \times W$, and thus a power generation area efficiency is represented by $((L_1 \times W)/(L \times W)) \times 100$. For example, when L is 12 mm, $L_1$ is 10 mm and W is 10 mm, the power generation area efficiency equals to $((10 \times 10)/(12 \times 10)) \times 100 = (100/120) \times 100 = 83\%$.

<Other Elements>

The dye-sensitized solar cell 10 according to the first embodiment may further include a reverse electron transfer preventing layer (not shown) between the transparent electrode 11 and the semiconductor layer 12. The reverse electron transfer preventing layer is composed of oxide semiconductor particles and has a film structure denser than the semiconductor layer 12. As the oxide semiconductor particles in use for the reverse electron transfer preventing layer 17, materials as with oxide semiconductor particles of the semiconductor layer 12 may be employed. The oxide semiconductor particles of the reverse electron transfer preventing layer and the oxide semiconductor particles of the semiconductor layer 12 may be made of an identical material or different materials for each other. In a case of having the reverse electron transfer preventing layer, the photosensitizing dye may be preferably adsorbed on at least a part of a surface of the reverse electron transfer preventing layer. Alternatively, the photosensitizing dye and the oxide semiconductor particles may exist in a mingled manner.

The presence of the reverse electron transfer preventing layer in a form of a dense film structure may be confirmed under an electron microscopic observation accompanying a chemical composition analysis of a cross-section structure. Specifically, as approaching the surface of the transparent electrode 11 from the counter electrode 15, it is observable that the oxide semiconductor particles having a relatively large particle size are accumulated with voids opened in part, and as further approaching the surface of the transparent electrode 11, it is observable that oxide semiconductor particles having a relatively small particle size are densely accumulated in a film structure. This film structure may be identified as the reverse electron transfer preventing layer.

A size of individual particle of the oxide semiconductor particles included in the reverse electron transfer preventing layer may be preferably about more than or equal to 0.1 nm and less than or equal to 5 nm in diameter. It is inferred that the reverse electron transfer preventing layer has a different effect from the oxide semiconductor particles of the semiconductor layer 12. It is considered that the reverse electron transfer preventing layer plays a role of suppressing contacts of $I_3^-$ with the transparent electrode 11.

A thickness of the reverse electron transfer preventing layer may be preferably more than or equal to 1 nm and less than or equal to 1 μm. By setting up the thickness as more than or equal to 1 nm, it is possible to well suppress contacts of $I_3^-$ with the transparent electrode 11. Further, by setting up the thickness as less than or equal to 1 μm, it is possible to well transfer electrons to the transparent electrode 11.

As a method of manufacturing the reverse electron transfer preventing layer in a dense film structure, it is acceptable to employ a sol-gel method with use of an alkoxide containing a metal included in a target oxide. A method is not limited to this manufacturing method, and any conventional technique related to a method of forming a film comprising fine particles may be appropriately referred.

<Modification>

The dye-sensitized solar cell 10 having the sealing layer 16 only on the four side surfaces formed by the power generation layer 14 and the counter electrode 15 has been described in the first embodiment, but as shown in FIG. 2, the sealing layer 16 may also be formed on a part of the main surface 15a of the counter electrode 15 as a modification. The dye-sensitized solar cell 10 may have the electrode extraction region 15h of the counter electrode 15 in a region not having the sealing layer 16 on the main surface 15a of the counter electrode 15. The sealing layer 16 is firmly formed by allowing it to extend onto a part of the main surface 15a of the counter electrode 15 in this manner, resulting in that higher durability can be realized.

Second Embodiment

Next, a dye-sensitized solar cell 20 according to a second embodiment of the present invention is described with reference to FIGS. 3A to 3C. FIGS. 3A to 3C show the dye-sensitized solar cell 20 according to the second embodiment in a first step, a second step and a third step of a second method of manufacturing the same, respectively.

<First Step>

As shown in FIG. 3A, a transparent electrode 21 in a rectangular shape is prepared. The transparent electrode 21 has a first main surface 21a, a second main surface 21k, a side surface 21b, a side surface 21d, a side surface 21e and a side surface 21f. First, a power generation layer 24 in a pentagonal shape is obtained by forming a semiconductor layer 22 on a region other than a triangular region 21g on the first main surface 21a of the transparent electrode 21, allowing a photosensitizing dye (not shown) to be absorbed onto the semiconductor layer 22, and forming an electrolyte layer 23 on the semiconductor layer 22 with the photosensitizing dye absorbed. A side surface 24b of the power generation layer 24 is constituted by a side surface 22b of the semiconductor layer 22 and a side surface 23b of the electrolyte layer 23, and a side surface 24c of the power generation layer 24 is constituted by a side surface 22c of the semiconductor layer 22 and a side surface 23c of the electrolyte layer 23. A reference sign 24e is assigned to a side surface opposite to the side surface 24b of the power generation layer 24, and a reference sign 24f is assigned to a side surface opposite to the side surface 24d of the power generation layer 24.

<Second Step>

Next, as shown in FIG. 3B, a counter electrode 25 is formed on a main surface 24a (see FIG. 3A) of the power generation layer 24. The counter electrode 25 is formed in such a manner that a side surface 25b, a side surface 25c, a side surface 25d, a side surface 25e and a side surface 25f of the counter electrode 25 are positioned coplanar with the side surface 24b, the side surface 24c, the side surface 24d, the side surface 24e and the side surface 24f of the power generation layer 24, respectively, and an electrode extraction region 25h (see FIG. 3C) of the counter electrode 25 overlaps with the main surface 24a of the power generation layer 24 in a top view.

<Third Step>

Finally, as shown in FIG. 3C, a sealing layer 26 is formed extending from the transparent electrode 21 onto a part of a main surface 25a of the counter electrode 25 so as to cover the side surface 24b, the side surface 24c, the side surface 24d, the side surface 24e and the surface 24f of the power generation layer 24.

In the dye-sensitized solar cell 20 according to the second embodiment, a region not having the sealing layer 26 on the main surface 25a of the counter electrode 25 is the electrode extraction region 25h of the counter electrode 25. The sealing layer 26 is formed by allowing it to extend onto a part of the main surface 25a of the counter electrode 25 in this manner, resulting in that sealing can be firmed. Further, a region not having the sealing layer 26 in the triangular region 21g on the first main surface 21a of the transparent electrode 21 is an electrode extraction region 21h of the transparent electrode 21, and the electrode extraction region 21h is smaller as compared with the electrode extraction region 11 of the dye-sensitized solar cell 10 according to the first embodiment. Based on such a structure, it is possible to make larger a ratio of a power generation area with respect to a cell light receiving area and thus to increase a power generation area efficiency.

<Power Generation Area Efficiency>

In the dye-sensitized solar cell 20 according to the second embodiment, the second main surface 21k of the transparent electrode 21 is a light incident surface, and, as shown in FIG. 3C, a cell light receiving area in the second embodiment is represented by L×W. Since a power generation area is obtained by subtracting an area of the triangular area 21g from the cell light receiving area, it is represented by $(L \times W)-((L_2 \times W_2)/2)$, and thus the power generation area efficiency is represented by $(((L \times W)-((L_2 \times W_2)/2))/(L \times W)) \times 100$. For example, when L is 10 mm, W is 10 mm, $L_2$ is 2 mm and $W_2$ is 2 mm, the power generation area efficiency equals to $(((10 \times 10)-((2 \times 2)/2))/(10 \times 10)) \times 100 = (98/100) \times 100 = 98\%$, and it is possible to further increase a power generation area efficiency as compared with the first embodiment.

Third Embodiment

Next, a dye-sensitized solar cell 30 according to a third embodiment of the present invention is described with reference to FIG. 4. In the dye-sensitized solar cell 30 according to the third embodiment, the transparent electrode 31 may be formed in a conductive thin film made of a resin film having ITO (Indium Tin Oxide) with a thickness of 10 nm to 500 nm. FIG. 4 shows a cross-sectional view of the dye-sensitized solar cell 30 in a case of using a resin film having ITO as the transparent electrode 31.

As shown in FIG. 4, the dye-sensitized solar cell 30 includes: a power generation layer 34 including a semiconductor layer 32 and an electrolyte layer 33 provided on a first main surface 31a of a transparent electrode 31; and a counter electrode 35. In a right side of the figure, a sealing layer 36 is formed extending from a main surface 35a of the counter electrode 35 to a side surface and a first main surface 31a of the transparent electrode 31. And, in a left side of the figure, the sealing layer 36 is formed extending from a main surface 35a of the counter electrode 35 to a side surface and a second main surface 31k of the transparent electrode 31. Although not shown, in other side surfaces, the sealing layer 36 is formed extending from the main surface 35a of the counter electrode 35 to other side surfaces and the second main surface 31k of the transparent electrode 31. A region not having the sealing layer 36 on the transparent electrode 31 is an electrode extraction region 31h of the transparent electrode 31, and a region not having the sealing layer 36 on the main surface 35a of the counter electrode 35 is an electrode extraction region 35h of the counter electrode 35.

Although the second main surface 31k of the transparent electrode 31 is a light incident surface, it is possible to firmly seal the dye-sensitized solar cell 30 without reducing a light receiving area by making the sealing layer 36 of a transparent resin such as an acrylic resin, even in a case that the sealing layer 36 is formed onto the second main surface 31k of the transparent electrode 31. By forming the transparent electrode 31 as a conductive thin film in this manner, it contributes to reducing a thickness of a system to be mounted with the cell and the effect of excellent portability is achieved because of being hard to break and reducing a weight of the cell.

Effects of Embodiments

Here, for comparison, a conventional dye-sensitized solar cell is described. FIG. 5 shows a schematic top view of a conventional dye-sensitized solar cell 100, and FIG. 6 shows a schematic cross-sectional view taken along a line A-A in FIG. 5.

As shown in FIGS. 5 and 6, the dye-sensitized solar cell 100 includes a power generation layer 102 and a counter electrode 103 on a transparent electrode 101, and side surfaces of the power generation layer 102 are positioned inside side surfaces of the transparent electrode 101 and the counter electrode 103. An electrode extraction region 101h of the transparent electrode 101 and an electrode extraction region 103h of the counter electrode 103 does not overlap with the power generation layer 102 in a top view but are arranged adjacent thereto, unlike the dye-sensitized solar cells according to the above embodiments. Therefore, when viewed from above, a cell light receiving area of the dye-sensitized solar cell 100 becomes larger as compared with the above embodiments due to presence of the electrode extraction region 101h of the transparent electrode 101, the electrode extraction region 103h of the counter electrode 103 and further a sealing layer 104. Then, a power generation area becomes smaller due to presence of the sealing layer 104 within the cell light receiving area. For example, when L is 14 mm and W is 10 mm, the cell light receiving area L×W equals to 14×10=140 mm². When the power generation area $L_3 \times W_3$ equals to 8×8=64 mm² as a usual case, a power generation area efficiency equals to (64/140)×100=46%.

On contrast, in the dye-sensitized solar cell according to any embodiment of the present invention, the power generation area efficiency can be greatly improved as compared with the conventional cell, since at least a part of the side surfaces of the counter electrode and at least a part of the side surfaces of the power generation layer are positioned coplanar, the electrode extraction region of the counter electrode overlaps with at least a part of the main surface of the power generation layer in a top view, and the sealing layer is formed extending from one of the transparent electrode and the counter electrode to the other so as to cover the side surfaces of the power generation layer.

Although the dye-sensitized solar cell according to any embodiment of the present invention is applicable to any apparatus for use in both outdoor and indoor, it is particularly suitable to use them in a low illuminance environment and then it is preferable to install them in an electronic apparatus or the like for use in indoor. For example, in the embodiments of the present invention, it is possible to easily obtain the dye-sensitized solar cells with a power generation amount of more than or equal to $3.6 \times 10^{-6}$ W/cm² and a current value of more than or equal to $1.05 \times 10^{-5}$ A/cm² in a low illuminance environment at 200 lux in illuminance.

Since the dye-sensitized solar cell according to any embodiment of the present invention is excellent in usage in a low illuminance environment, it can be mounted on an electronic component for use. Examples of the electronic component may include a wireless sensor or a beacon in which the dye-sensitized solar cells according to the embodiments of the present invention is incorporated as a main power source or an auxiliary power source.

EXAMPLES

Hereinafter, the above embodiments are described more specifically with reference to Examples, but the scope of the present invention is not limited to Examples as shown below.

Example 1

The dye-sensitized solar cell in a form shown in FIGS. 1A to 1C was produced. The reverse electron transfer preventing layer was formed by applying an alcohol solution prepared from titanium alkoxide on an FTO surface of a glass/FTO substrate in 12 mm(L)×10 mm(W)×1.1 mm(thickness) and followed by heating at 550° C. Next, a titanium oxide paste (trade name "PST-30NRD") manufactured by JGC Catalysts & Chemicals, Ltd. was printed on the FTO surface provided with the reverse electron transfer preventing layer in an area of 1 cm² by a screen-printing method. At this time, an area of 2 mm(L–$L_1$)×10 mm(w) in an end portion was left for the electrode extraction region. The applied titanium oxide paste was heated together with the glass/FTO substrate at 550° C. for about 30 minutes so as to remove organic component contained in the titanium oxide paste. The power generation layer thus obtained was immersed into a dye solution (dye: CYC-B11(K), concentration: 0.2 mmol/L) prepared by dissolving a dye in an organic solvent mixed with acetonitrile and t-butanol at a volume ratio of one-to-one. And then, the power generation layer was allowed to stand at 50° C. for 4 hours so that the dye was adsorbed. Separately, a positive electrode was prepared by sputtering platinum onto one surface of a titanium substrate in 10 mm($L_1$)×10 mm(W)×100 μm(thickness).

A solid electrolyte precursor was prepared by uniformly mixing iodine, 1,3-dimethylimidazolium iodide (DMII), acetonitrile and polyethylene oxide having a molecular weight of 1,000,000. The solid electrolyte precursor of 20 uL was dropped on the power generation layer of the negative electrode subjected to dye adsorption, and the power generation layer was heated to 100° C. for 5 minutes to volatilize acetonitrile in excess contained in the solid electrolyte precursor.

The negative electrode having the power generation layer after immersed with the solid electrolyte was returned to room temperature and opposed to the positive electrode of platinum, and the electrode extraction region of the negative electrode was held by 2 mm. At this time, the positive and negative electrodes were opposed in a vacuum state. Inclusion of bubbles in the solid electrolyte can be suppressed by allowing the positive and negative electrodes to oppose each other in a vacuum state. In this state, an ultraviolet curable resin (trade name "TB3017B", manufactured by Three Bond Co., Ltd.) was applied to three side surfaces, not having the electrode extraction region, of the glass/FTO substrate of the negative electrode, and the side surfaces of the negative electrode and a part of the surface not covered with platinum of the positive electrode substrate were sealed with the ultraviolet curable resin by ultraviolet irradiation. On the other hand, with respect to the electrode extraction region of the negative electrode, the ultraviolet curable resin was applied to a part of an electrode portion of the negative electrode and a part of the surface not covered with platinum of the positive electrode substrate and then was cured by ultraviolet irradiation to be sealed.

In Example 1, with respect to a light incident surface, a power generation area equaled to 10 mm($L_1$)×10 mm(W), whereas an area of the cell equaled to 12 mm(L)×10 mm(W). So, a power generation area efficiency equaled to (100/120)×100=83.3%.

Example 2

The dye-sensitized solar cell in a form shown in FIGS. 3A to 3C was produced. The reverse electron transfer preventing layer was formed by applying an alcohol solution prepared from titanium alkoxide on an FTO surface of a glass/FTO substrate in 10 mm(L)×10 mm(W)×1.1 mm(thickness) and followed by heating at 550° C. Next, a titanium oxide paste (trade name "PST-30NRD") manufactured by JGC Catalysts & Chemicals, Ltd. was printed on the FTO surface provided with the reverse electron transfer preventing layer in an area of 1 $cm^2$ by a screen printing method. At this time, an area of a right triangle in 2 mm($L_2$)×2 mm($W_2$) was left for the electrode extraction region at one corner. The applied titanium oxide paste was heated together with the glass/FTO substrate at 550° C. for about 30 minutes so as to remove organic component contained in the titanium oxide paste. The power generation layer thus obtained was immersed into a dye solution (dye: CYC-B11(K), concentration: 0.2 mmol/L) prepared by dissolving a dye in an organic solvent mixed with acetonitrile and t-butanol at a volume ratio of one-to-one. And then, the power generation layer was allowed to stand at 50° C. for 4 hours so that the dye was adsorbed. Separately, a positive electrode was prepared by cutting off an area of a right triangle in 2 mm($L_2$)×2 mm($W_2$) from one corner of a titanium substrate in 10 mm(L)×10 mm(W)×100 μm(thickness) to prepare a pentagonal substrate. A positive electrode was prepared by sputtering platinum onto one surface of the pentagonal substrate.

A solid electrolyte precursor was prepared by uniformly mixing iodine, 1,3-dimethylimidazolium iodide (DMII), acetonitrile and polyethylene oxide having a molecular weight of 1,000,000. The solid electrolyte precursor of 20 μL was dropped on the power generation layer of the negative electrode subjected to dye adsorption, and the power generation layer was heated to 100° C. for 5 minutes to volatilize acetonitrile in excess contained in the solid electrolyte precursor.

The negative electrode having the power generation layer after immersed with the solid electrolyte was returned to room temperature and opposed to the positive electrode of platinum in such a manner that the positive and negative electrodes overlapped with each other while harmonizing two right triangles in 2 mm($L_2$)×2 mm($W_2$). At this time, the positive and negative electrodes were opposed in a vacuum state. Inclusion of bubbles in the solid electrolyte can be suppressed by allowing the positive and negative electrodes to oppose each other in a vacuum state. In this state, an ultraviolet curable resin (trade name "TB3017B", manufactured by Three Bond Co., Ltd.) was applied to side surfaces, not having the electrode extraction region, of the glass/FTO substrate of the negative electrode, and the side surfaces of the negative electrode and a part of the surface not covered with platinum of the positive electrode substrate were sealed with the ultraviolet curable resin by ultraviolet irradiation. On the other hand, with respect to the electrode extraction region of the negative electrode, the ultraviolet curable resin was applied to a part of an electrode portion of the negative electrode and a part of the surface not covered with platinum of the positive electrode substrate and then was cured by ultraviolet irradiation to be sealed.

In Example 2, with respect to a light incident surface, a power generation area equaled to 10 mm(L)×10 mm(W)−(2 mm($L_2$)×2 mm($W_2$))/2, whereas an area of the cell equaled to 10 mm(L)×10 mm(W). So, a power generation area efficiency equaled to (98/100)×100=98%.

Comparative Example 1

A dye-sensitized solar cell in a form of Comparative Example 1 was produced. A reverse electron transfer preventing layer was formed by applying an alcohol solution prepared from titanium alkoxide on an FTO surface of a glass/FTO substrate in 12 mm(L)×10 mm(W)×1.1 mm(thickness) and followed by heating at 550° C. Next, a titanium oxide paste (trade name "PST-30NRD") manufactured by JGC Catalysts & Chemicals, Ltd. was printed on the FTO surface provided with the reverse electron transfer preventing layer in an area of 1 $cm^2$ by a screen printing method. At this time, an area of 2 mm×10 mm was left for an electrode extraction region. The applied titanium oxide paste was heated together with the glass/FTO substrate at 550° C. for about 30 minutes so as to remove organic component contained in the titanium oxide paste. The power generation layer thus obtained was immersed into a dye solution (dye: CYC-B11(K), concentration: 0.2 mmol/L) prepared by dissolving a dye in an organic solvent mixed with acetonitrile and t-butanol at a volume ratio of one-to-one. And then, the power generation layer was allowed to stand at 50° C. for 4 hours so that the dye was adsorbed. Separately, a positive electrode was prepared by sputtering platinum onto the FTO surface of the glass/FTO substrate in 12 mm(L)×10 mm(W)×1.1 mm(thickness).

The negative electrode having the power generation layer after immersed with the solid electrolyte was returned to room temperature and opposed to the positive electrode of platinum in such a manner that two areas in 10 mm(L)×10 mm(W) of the positive and negative electrodes overlapped with each other. At this time, the positive and negative electrodes were opposed in a vacuum state. In this state, an ultraviolet curable resin (trade name "TB3017B", manufactured by Three Bond Co., Ltd.) was applied to four side surfaces of the area of 10 mm(L)×10 mm(W) and then was cured by ultraviolet irradiation to be sealed.

In Comparative Example 1, with respect to a light incident surface, a power generation area equaled to 10 mm(L)×10 mm(W), whereas an area of the cell equaled to 14 mm×10 mm. So, a power generation area efficiency equaled to (100/140)×100=71%.

The invention claimed is:
1. A dye-sensitized solar cell comprising:
 a transparent electrode having a first main surface, a second main surface, and side surfaces;
 a power generation layer formed on the first main surface of the transparent electrode, comprising a semiconductor layer, a photosensitizing dye and an electrolyte layer and having a main surface and side surfaces; and a counter electrode formed on the main surface of the power generation layer, having a main surface, side surfaces, and an electrode extraction region, wherein:

all the side surfaces of the counter electrode and all the side surfaces of the power generation layer are positioned coplanar, respectively, the electrode extraction region of the counter electrode overlaps the main surface of the power generation layer in a top view, in a top view, all the side surfaces of the transparent electrode are positioned coplanar with those of the counter electrode and the power generation layer, except for a corner portion connecting two adjacent side surfaces of the transparent electrode, where the counter electrode and the power generation layer do not cover the corner portion so that the first main surface of the transparent electrode is exposed solely at the corner portion, forming an electrode extraction region of the transparent electrode, wherein the electrode extraction region of the counter electrode and the electrode extraction region of the transparent electrode face in a same direction which is a thickness direction of the dye-sensitized solar cell, and the side surfaces of the power generation layer are covered with a sealing layer formed extending from one of the transparent electrode and the counter electrode to the other.

2. The dye-sensitized solar cell according to claim 1, wherein the electrolyte layer is in a gel-like state or in a solid-like state.

3. The dye-sensitized solar cell according to claim 2, wherein the electrolyte layer contains a matrix.

4. The dye-sensitized solar cell according to claim 1, wherein the sealing layer contains an ultraviolet curable resin or a thermosetting resin.

5. The dye-sensitized solar cell according to claim 1, wherein the sealing layer includes a reflective member.

6. The dye-sensitized solar cell according to claim 1, wherein the sealing layer is formed onto at least a part of the main surface of the counter electrode, and the electrode extraction region of the counter electrode is arranged in a region not having the sealing layer on the main surface of the counter electrode.

7. The dye-sensitized solar cell according to claim 6, wherein the counter electrode is formed as a conductive thin film.

8. The dye-sensitized solar cell according to claim 1, wherein the sealing layer is transparent and is formed extending from the counter electrode to a side surface and at least a part of the second main surface of the transparent electrode.

9. The dye-sensitized solar cell according to claim 8, wherein the transparent electrode is formed as a conductive thin film.

10. The dye-sensitized solar cell according to claim 1, wherein the sealing layer is made of a transparent resin and extends to at least part of the second main surface of the transparent electrode.

11. The dye-sensitized solar cell according to claim 1, wherein the transparent electrode includes a transparent substrate, constituting the second main surface of the transparent electrode.

12. A method of manufacturing a dye-sensitized solar cell, comprising:

a first step of obtaining a power generation layer by forming a semiconductor layer on a first main surface of a transparent electrode, allowing a photosensitizing dye to be absorbed onto the semiconductor layer, and forming an electrolyte layer in a gel-like state or in a solid-like state on the semiconductor layer with the photosensitizing dye absorbed;

a second step of forming a counter electrode on a main surface of the power generation layer in a manner that all the side surfaces of the counter electrode and all the side surfaces of the power generation layer are positioned coplanar, respectively, and an electrode extraction region of the counter electrode overlaps with a main surface of the power generation layer in a top view, wherein, in a top view, all side surfaces of the transparent electrode are positioned coplanar with those of the counter electrode and the power generation layer, except for a corner portion connecting two adjacent side surfaces of the transparent electrode, where the counter electrode and the power generation layer do not cover the corner portion so that the first main surface of the transparent electrode is exposed solely at the corner portion, forming an electrode extraction region of the transparent electrode, wherein the electrode extraction region of the counter electrode and the electrode extraction region of the transparent electrode face in a same direction which is a thickness direction of the dye-sensitized solar cell; and a third step of forming a sealing layer extending from one of the transparent electrode and the counter electrode to the other so as to cover the side surfaces of the power generation layer.

13. The method of manufacturing a dye-sensitized solar cell according to claim 12, wherein the gel-like state or the solid-like state of the electrolyte layer remains at least until termination of the third step from start of forming the electrolyte layer.

* * * * *